(No Model.)
J. OSFORD.
CAR COUPLING.
No. 317,182. Patented May 5, 1885.
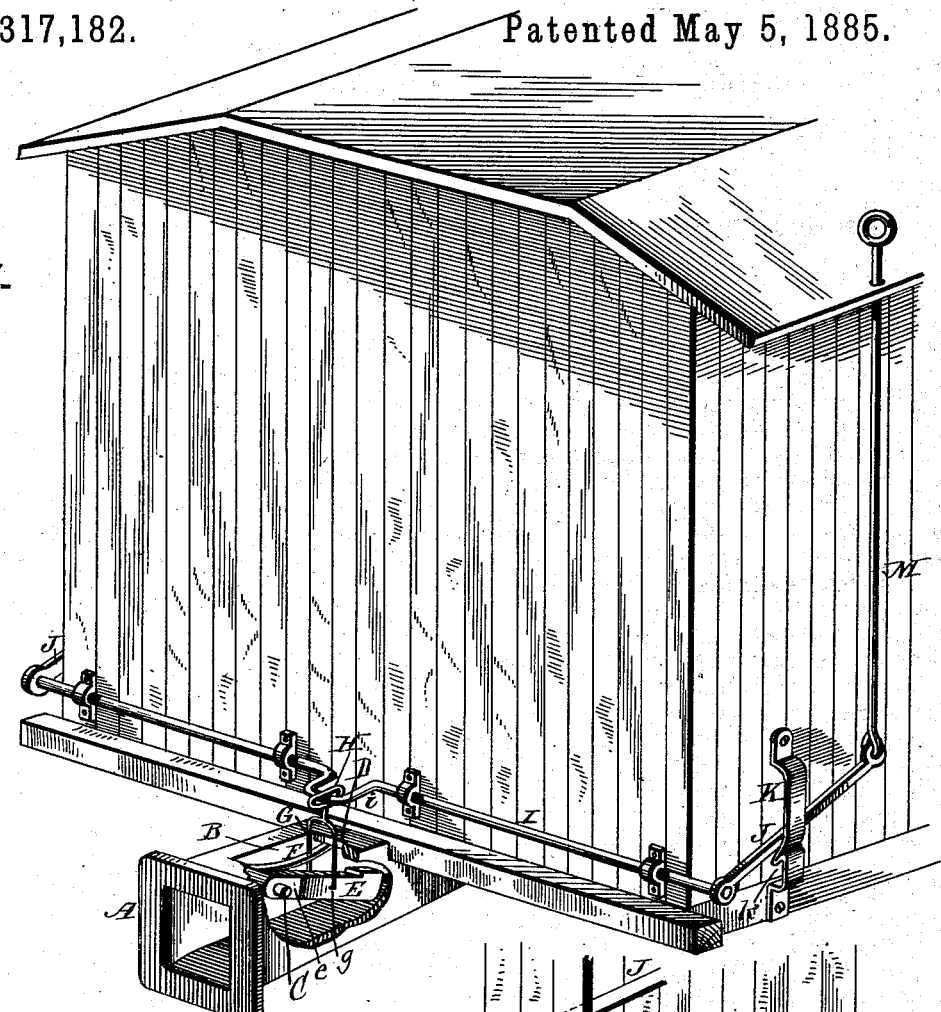
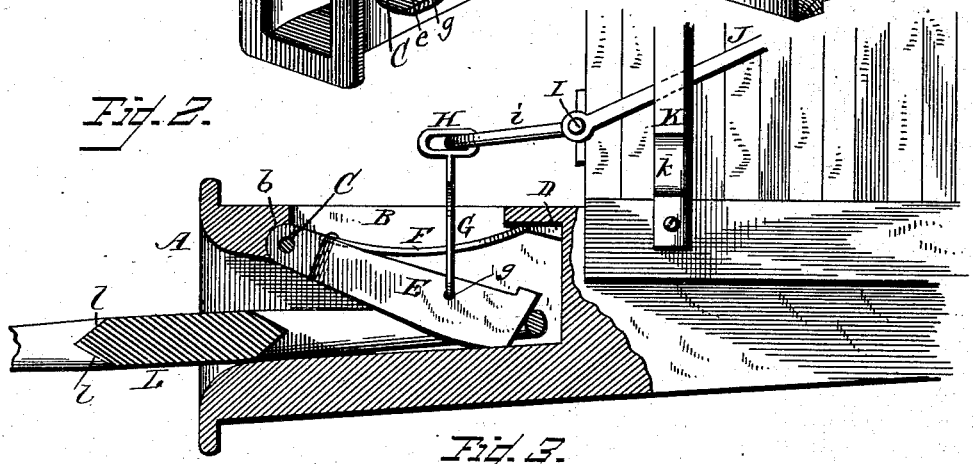
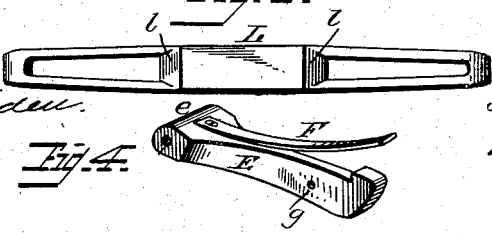
Witnesses
Inventor
Joseph Osford,
per Chas. H. Fowler
Attorney

UNITED STATES PATENT OFFICE.

JOSEPH OSFORD, OF WORTHINGTON, MINNESOTA.

CAR-COUPLING.

SPECIFICATION forming part of Letters Patent No. 317,182, dated May 5, 1885.

Application filed February 26, 1885. (No model.)

*To all whom it may concern:*

Be it known that I, JOSEPH OSFORD, a citizen of the United States, residing at Worthington, in the county of Nobles and State of Minnesota, have invented certain new and useful Improvements in Car-Couplings; and I do hereby declare that the following is a full, clear, and exact description of the same, reference being had to the annexed drawings, making a part of this specification, and to the letters and figures of reference marked thereon.

This invention is an improvement in car-couplings intended especially for use on freight and flat cars, and has for an object to provide a coupling which may be conveniently operated from one or the other side of the car, and which will not require the brakeman to go between the cars either to couple or uncouple. The invention also aims to so construct and connect the parts that they will operate firmly and smoothly in the desired manner.

The invention consists in certain novel constructions, combinations, and arrangement of parts, which will be first fully described, and then pointed out in the claims.

In the drawings, Figure 1 is a perspective view of one end of a car provided with my improvements, the draw-head being partly broken away. Fig. 2 is a side view of the coupling, the draw-head, dog, and link being sectioned. Fig. 3 is a detail plan view of the link, and Fig. 4 is a detail perspective view of the dog and its spring.

The draw-head A is provided in its upper side with a slot, B, elongated in the direction of length of the draw-head. The front wall of this slot is provided near its inner edge with a mortise, $b$, curved in the arc of a circle struck from the openings for the pin C, for the purpose presently described. A guide-groove, D, is formed on the inner side of the top plate of the draw-head in rear of the slot B. This groove is preferably cast in the formation of the draw-head, but may be attained by properly arranging two bars or cleats on the inner side of the said top plate. The coupling-dog E has its upper end, $e$, widened out to properly fit between the side walls of the draw-head, and the body or point of said dog is narrowed so that it will fit in the link. By widening out the upper portion of the link, which is provided longitudinally with an opening for the pin C, I provide a longer bearing for the said pin, and consequently reduce the frictional wear thereon. This construction also strengthens the support of the dog, obviates the necessity of shoulders or stops for preventing lateral displacement of the dog, and reduces the strain on the pin C by fitting the pivoted portion of the dog snugly between the side walls of the draw-head.

It will be noticed from Fig. 2 that the upper end of the dog is curved to fit closely the curvature of mortise. By this relative construction the dog is free to move on its pivot, and the forward strain exerted on the dog by the link is borne in great part by the draw-head, and is removed from pin C. In this construction it will be seen the widening of part $e$ of the dog distributes the wear from end to end of the mortise $b$ and avoids undue wear on any one part thereof. A bar-spring, F, is secured at its forward end on the dog E, and bears with an upward tension at its rear end in the groove D. This spring gives the dog a tension downward at its point and holds such point normally against the bottom of the draw-head. By arranging the free end of the spring F in the guide-groove D such spring is held to its place, and all lateral movement of its free end is avoided.

The connection between the dog and its operating devices is formed with a loop, G, and an elongated eye, H. The loop G has its lower end or cross bar passed through an opening, $g$, formed through the dog, and the arms of such loop extend up on opposite sides of the dog, so that the elevating force applied to such loop G is exerted evenly on the dog. The eye H is elongated in the direction of length of the draw-head. A shaft, I, is journaled to and extends across the end of the car, and is provided at its center with a crank, $i$, the wrist of which operates in the eye H. As the shaft I is turned its crank will raise or lower the dog E. By elongating the eye H the wrist of crank $i$ may move therein, so that the force of the crank on the dog may be exerted at all times in a true vertical line, enabling the easier manipulation of the said dog, as will be seen. The shaft I has crank-arms J J fixed to or bent from its opposite ends alongside the car. One of these arms extends through a keeper, K, secured on the side of the car. By preference I form this keeper of spring metal, and bend in it a hook, *k*, constructed as shown most clearly in Fig. 1. By this hook *k* the arm J may, when depressed, be held, and the dog be accordingly elevated, so that the link may be withdrawn. By so locking the dog any number of such parts may be adjusted when the train is at rest, so that when started the cars will uncouple. By forming the keeper K of spring metal the arm J may be conveniently engaged with hook *k* by pushing down on the upper inclined side of said hook. In order to release bar J, the said bar is usually made slightly flexible laterally, so it may be turned out of engagement with the hook. The link L has its ends rounded or chamfered on their upper and lower sides, so it will readily slip under the dog, when inserted in the draw-head, into the locked position shown in Fig. 3. The middle portion of the link is made solid for strength, and has its ends beveled or inclined, as shown at *l*. By such bevel or inclination, when a car is coupled with a higher one, the dog of the lower car will not be engaged by any square shoulders; but the inclined portion *l* will rest flat against the dog, obviating all wear and damage to the dog which would result from a square shoulder.

To one of the crank-arms J, preferably the one engaged by keeper K, I secure a rod, M, which extends up above the car. By this rod the coupling may be operated from the top of the car, and by arms J it may be operated from the ground on either side of the car.

Having thus described my invention, what I claim, and desire to secure by Letters Patent, is—

1. The combination, with the coupling devices, and a shaft having a crank whereby to operate said devices, and provided at its ends with crank-arms extended alongside the car, of a keeper placed over one of said crank-arms and provided with a hook, said keeper being made of spring metal, whereby the arm may be moved into engagement with its hook, substantially as set forth.

2. The car-coupling herein described, consisting of the draw-head having a curved mortise, *b*, opening B, and guide-groove D, the pivoted dog having its end *e* curved and fitted snugly in the mortise *b*, the spring F, secured at one end to the dog and bearing at its other end in the groove D, the connecting device attached to the dog, and provided with an elongated eye, H, a shaft journaled to the car and having its crank *i* operating in eye H, the arms J, extended from the shaft alongside the car, a keeper, K, made of spring metal, fitted over one of arms J, and having a hook, *k*, and a rod secured to one of the arms J and extended to the top of the car, substantially as set forth.

In testimony that I claim the above I have hereunto subscribed my name in the presence of two witnesses.

JOSEPH OSFORD.

Witnesses:
 MILTON P. MANN,
 MARIAN L. CRANDALL.